United States Patent
Rudolph

(10) Patent No.: US 11,331,854 B2
(45) Date of Patent: May 17, 2022

(54) SYSTEM AND METHOD FOR DISPENSING COMPOSITE FILAMENTS FOR ADDITIVE MANUFACTURING

(71) Applicant: AREVO, INC., Santa Clara, CA (US)

(72) Inventor: Natalie Margaretha Rudolph, Santa Clara, CA (US)

(73) Assignee: Arevo, Inc., Milpitas, CA (US)

( * ) Notice: Subject to any disclaimer, the term of this patent is extended or adjusted under 35 U.S.C. 154(b) by 752 days.

(21) Appl. No.: 15/935,968

(22) Filed: Mar. 26, 2018

(65) Prior Publication Data

US 2019/0291346 A1  Sep. 26, 2019

(51) Int. Cl.
*B29C 64/264* (2017.01)
*B29C 64/118* (2017.01)
(Continued)

(52) U.S. Cl.
CPC ........ *B29C 64/264* (2017.08); *B29C 35/0805* (2013.01); *B29C 64/118* (2017.08);
(Continued)

(58) Field of Classification Search
CPC .............................. B29C 64/264; B33Y 10/00
See application file for complete search history.

(56) References Cited

U.S. PATENT DOCUMENTS 5,204,124 A * 4/1993 Secretan ............... B29C 64/124
425/145
6,358,354 B1 * 3/2002 Patil ........................... B41J 2/16
156/273.3
(Continued)

FOREIGN PATENT DOCUMENTS

CN 107283826 A * 10/2017
CN 108381908 A * 8/2018
CN 110253879 A * 9/2019

OTHER PUBLICATIONS

Griffini, G., Invernizzi, M., Levi, M., Natale, G., Postiglione, G. and Turri, S., 2016. 3D-printable CFR polymer composites with dual-cure sequential IPNs. Polymer, 91, pp. 174-179. (Year: 2016).*
(Continued)

*Primary Examiner* — Nicholas R Krasnow
(74) *Attorney, Agent, or Firm* — Botos Churchill IP Law LLP

(57) ABSTRACT

A method and apparatus for forming a 3D article. According to the method, a composite filament material is formed from a UV curable material, a thermoset polymer material and at least one of filaments or fibers. After the composite is formed, the filament is dispensed to form the 3D article. Dispense is typically through a nozzle or other orifice that delivers the composite filament material as a bead of material. As the composite is dispensed, at least a portion of the composite material is exposed to UV radiation thereby curing a portion of the dispensed composite filament. The UV radiation is provided by a light source than can target discrete portions of the dispensed composite filament. For this purpose, the UV radiation source can be a light source integrated with the nozzle or a steered light source. As the composite filament is dispensed, UV radiation is directed onto the composite filament. If a steered light source is used, the composite filament is dispensed and light from the steered UV radiation source is directed to targeted regions of the composite filament, introducing cured zones or regions into the composite filament.

17 Claims, 10 Drawing Sheets

(51) Int. Cl.

| | | |
|---|---|---|
| *B29C 35/08* | (2006.01) | |
| *B33Y 10/00* | (2015.01) | |
| *B33Y 30/00* | (2015.01) | |
| *B29C 64/218* | (2017.01) | |
| *B29K 307/04* | (2006.01) | |
| *B29K 101/10* | (2006.01) | |
| *B29K 105/00* | (2006.01) | |
| *B29K 105/12* | (2006.01) | |

(52) U.S. Cl.
CPC ............ *B29C 64/218* (2017.08); *B33Y 10/00* (2014.12); *B33Y 30/00* (2014.12); *B29C 2035/0827* (2013.01); *B29K 2101/10* (2013.01); *B29K 2105/0002* (2013.01); *B29K 2105/12* (2013.01); *B29K 2307/04* (2013.01)

(56) References Cited

U.S. PATENT DOCUMENTS

| | | | |
|---|---|---|---|
| 9,895,845 B2 | 2/2018 | Bheda et al. | |
| 9,908,978 B2 | 3/2018 | Reese et al. | |
| 2002/0055007 A1* | 5/2002 | Soane | C08F 287/00 |
| | | | 428/520 |
| 2003/0114552 A1* | 6/2003 | Schacht | A61L 27/16 |
| | | | 523/113 |
| 2004/0187714 A1* | 9/2004 | Napadensky | B33Y 40/00 |
| | | | 101/35 |
| 2011/0298877 A1* | 12/2011 | Blessing | B41M 7/0081 |
| | | | 347/102 |
| 2014/0232035 A1 | 8/2014 | Bheda | |
| 2016/0159009 A1* | 6/2016 | Canale | B33Y 10/00 |
| | | | 264/401 |
| 2016/0176118 A1 | 6/2016 | Riley | |
| 2016/0236414 A1 | 8/2016 | Reese | |
| 2016/0266573 A1 | 9/2016 | Bheda | |
| 2016/0271880 A1 | 9/2016 | Bheda | |
| 2016/0297142 A1 | 10/2016 | Bheda | |
| 2017/0015060 A1* | 1/2017 | Lewicki | B29C 64/106 |
| 2017/0096576 A1 | 4/2017 | Bheda | |
| 2017/0198104 A1 | 7/2017 | Bheda | |
| 2018/0126637 A1* | 5/2018 | Tyler | B29C 64/379 |
| 2018/0202080 A1* | 7/2018 | Kozar | B29C 64/336 |
| 2018/0311898 A1* | 11/2018 | Schwarzbaum | B29C 64/264 |
| 2019/0001561 A1* | 1/2019 | Stockett | B29C 64/40 |
| 2019/0039310 A1* | 2/2019 | Busbee | A43B 13/026 |
| 2019/0039311 A1* | 2/2019 | Busbee | A43B 3/0005 |
| 2019/0276689 A1* | 9/2019 | Dhoble | C09D 11/36 |
| 2021/0031449 A1* | 2/2021 | Belcher | B29C 64/227 |

OTHER PUBLICATIONS http://www.fabbaloo.com/blog/2017/1/9/essentium-develops-revolutionary-3d-printing-process (Jan. 9, 2017).

Invernizzi, Marta, et al., "UV-Assisted 3D Printing of Glass and Carbon Fiber-Reinforced Dual-Cure Polymer Composites", Materials, vol. 9, No. 583 doi:10.3390/ma9070583, 2016, p. 1-12.

\* cited by examiner

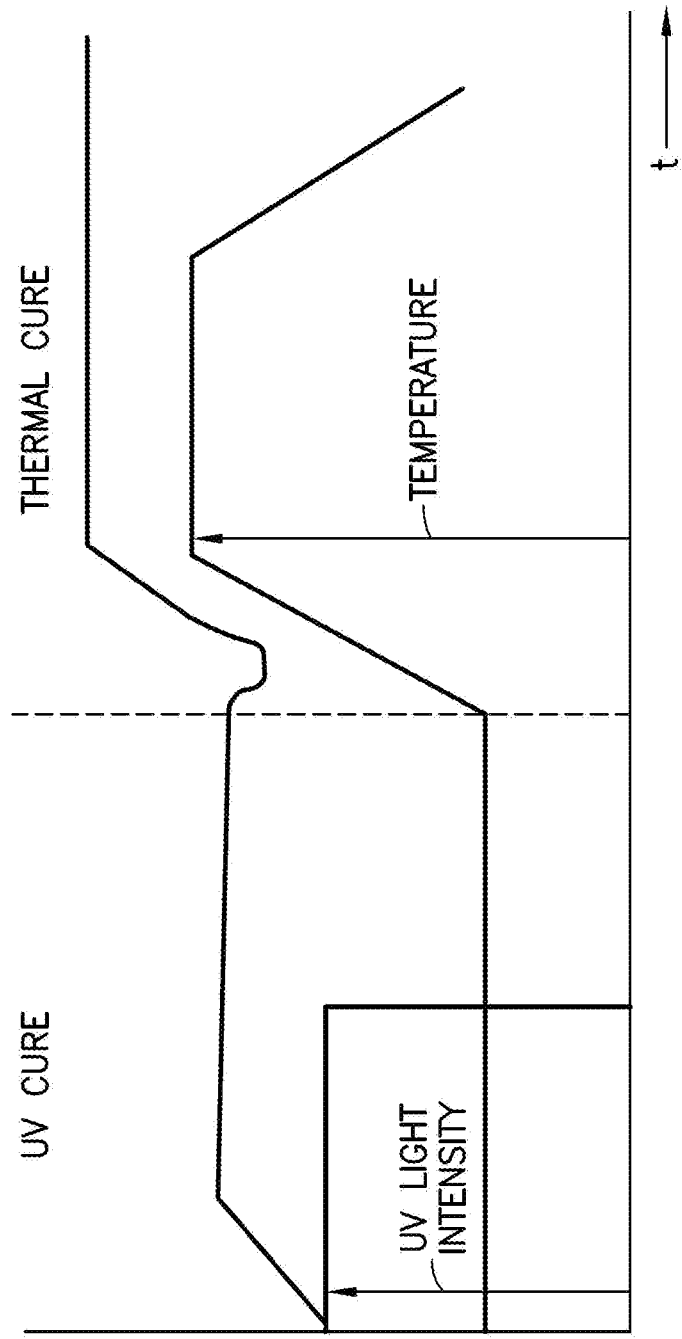

SYSTEM AND METHOD FOR DISPENSING COMPOSITE FILAMENTS FOR ADDITIVE MANUFACTURING

BACKGROUND OF THE INVENTION

Additive manufacturing has been utilized for printing three-dimensional parts by depositing successive layers of material in an automated manner. Prototyping is the most common application for additive manufacturing. The additive manufacturing process is widely known as the three-dimensional ("3D") printing of objects. Techniques of additive manufacturing include, without limitation, directed energy deposition (an additive manufacturing process in which focused thermal energy is used to fuse materials by melting as they are being deposited); material extrusion (an additive manufacturing process in which material is selectively dispensed through a nozzle or orifice); material jetting (an additive manufacturing process in which droplets of UV curable materials are selectively deposited and cured); powder bed fusion (an additive manufacturing process in which thermal energy selectively fuses regions of a powered bed); sheet lamination (an additive manufacturing process in which sheets of material are bonded to form an object); vat polymerization (an additive manufacturing process in which liquid photopolymer in a vat is selectively cured by light-activated polymerization); and powder/binder jetting (a process by which a liquid bonding agent is selectively deposited to join powder materials). In some of these techniques, a material (e.g., a heated and/or pressurized thermoplastic) may pass through a print head or nozzle. The print head or nozzle may be moved in a predefined trajectory (e.g., a tool path) as the material discharges from the print head, such that the material is laid down in a particular pattern and shape of overlapping layers. The material, after exiting the print head, may harden into a final form. Many methods involve the deposition of a thin layer of thermoplastic or thermoset materials.

Previous methods for forming 3D printed articles using composite filaments (e.g. polymer matrix materials in which fibers or particles are embedded) are described in http://www.fabbaloo.com/blog/2017/1/9/essentium-develops-revolutionary-3d-printing-process), which is hereby incorporated by reference. Such processes control the temperature of the article being formed to provide the desired interface between the dispensed composite filaments and the surface on which they are dispensed. Temperature control during article formation introduces added complexity to the 3D printing process.

There are manufacturing processes that deposit a liquified polymer or carbon impregnated polymer liquid formed from either a mixing device such as an extruder or a tape placement device. In some instances, the dispensed materials are dual-cure materials. Dual cure materials can simplify manufacturing by mitigating some of the temperature control considerations when composite filaments with a thermoset polymer matrix are used. The use of dual-cure polymer composites for UV-Assisted 3D Printing is described in Invernizzi, M., et al., "UV-Assisted 3D Printing of Glass and Carbon Fiber-Reinforced Dual-Cure Polymer Composites," Materials, Vol. 9 (583) pp. 1-12 (2016) www.mdpi.com/journal/materials. However, such composites are not adapted for high speed processes, as Invernizzi reports using printing speeds of 10 mm/s with a UV exposure time of 30 minutes. Invernizzi is incorporated by reference herein.

Achieving acceptable consolidation quality is made more difficult when deposition is done at a high speed. Speeds equal to or greater than 50 mm/s present these increased challenges. One solution to forming articles with an acceptable consolidation quality when the successive layers are deposited at high speed is to perform post processing steps to cause the layers to consolidate. Accordingly, improvement in such processes that will not require multiple time-consuming post processing steps continue to be sought.

BRIEF SUMMARY OF THE INVENTION

The present invention provides an apparatus and method that significantly reduces the manufacturing lead-time for objects comprising slow-curing cross-linking polymers often referred to as thermosetting polymers, such as polyamide-imide, made via additive manufacturing (i.e., 3D printing). Thermosetting polymers, as used herein, are polymers that cure in response to temperature but not in response to light (e.g. ultra violet (UV) radiation) light. Since UV radiation is not visible light, it is typically referred to as UV radiation. The sources for UV radiation are described herein as light sources and not radiation sources as they may generate a large spectrum of light in addition to radiation in the UV spectrum. UV light and UV radiation are therefore used interchangeably herein.

Typically, polymer cure occurs when the monomers or oligomers in the polymer matrix cross-link with each other. In the present invention a thermosetting polymer is mixed with a photocurable resin that together form a polymer matrix and fibers or particles dispersed in the matrix. Photocurable resins as used herein are polymers in which cross linking is induced by exposure to UV radiation. Typically, the degree of cure of photocurable resins depends upon the extent to which the UV radiation penetrates the resin. Thus, the resins are frequently not completely cured when exposed to UV radiation, and un-crosslinked reactive groups will be present in the photocured polymer. In those embodiments, at least some of the uncross-linked reactive groups will remain uncross-linked even after thermal cure of the thermosetting polymer in the matrix. However, photocurable resins that completely cure after being exposed to UV radiation followed by a thermal cure are considered to be useful in the methods described herein should such materials be developed and commercially deployed. Fibers, as used herein, are threads or threadlike structures made of materials that do not dissolve in or react with the polymer matrix material. The fibers or particles can be either a continuous phase or a discontinuous phase in the polymer matrix material. Non-limiting examples of suitable fiber or particle materials include glass fibers, aramid fibers, carbon fibers, natural fibers, etc. The matrix materials are mixed and dispensed through a nozzle for printing the 3D object. The matrix materials can be mixed in the nozzle or in a mixer upstream of the nozzle.

The mixture of matrix and fiber/particles is dispensed as a filament that can be subjected to an immediate UV cure, which will cure the photocurable component of the matrix. The UV cure imparts an immediate structural integrity to the dispensed filament. Since only the photocurable component of the matrix is cured, the filament remains malleable due to the presence of the uncured thermoset polymer in the filament.

The viscosity of the matrix is selected to work with the nature of the fibers or particles mixed with the matrix. In those embodiments where the fibers/particles form a continuous phase in the filament, the polymer matrix has a lower viscosity to wet the continuous phase. In those embodiments in which the matrix is mixed with discontinuous particles/ fibers the matrix has a higher viscosity since the discontinuous phase of fibers or particles do not provide structure to the dispensed filament. In those embodiments in which the fibers/particles form a continuous phase in the filament, the viscosity is about 1 pascal-seconds or less. In those embodiments in which the fibers/particles form a discontinuous phase in the filament, the viscosity is about 10 pascal-seconds to about 500 pascal-seconds. The rate of dispense of the composite filament is in the range of about 50 mm/s or higher.

As the filament is dispensed, ultraviolet (UV) radiation is directed onto the filament either before or simultaneously with the filament being incorporated into the 3-D article under manufacture. The wavelength of UV radiation is about 10 to about 400 nm. When fabricating 3D articles using filaments in an additive process, the filaments are typically supported by a substrate or by previously deposited filaments. In some methods of 3D printing, such as a 3D printing pen (e.g. the 3Doodler, which is commercially available), the filament is dispensed and drawn in free space to form the 3D object.

The result of the UV exposure is a filament with regions where the photopolymer in the polymer matrix is completely cured. The filament also has regions that are partially cured and completely uncured. The partially cured regions are a mixture of uncured and cured photopolymer and uncured thermoset polymer. Thermal cure should take place shortly after the 3D article is formed. If the 3D article sits with partially cured regions or uncured regions for some significant period of time, i.e. hours or days, the 3D article will become tacky or sticky. Although the inventor does not wish to be held to a particular theory, the tackiness or stickiness can be the result of polymer migration in the 3D article. The completely uncured regions contain uncured thermoset polymer and may also include uncured photopolymer. It is advantageous if the cured and partially cured regions of the filament are nearer the perimeter of the filament and the uncured regions are nearer to the center and at the center of the filament. The resulting filament is cured or partially cured at the exterior and either partially cured or uncured in the center of the filament.

When the dispense of single filament is complete (i.e. the desired length of filament has been dispensed), the filament is cut. In order to ensure that the cut end of the filament is completely cured, the UV cure intensity is increased. If the end of the filament is not completely cured, the fibers will displace laterally and move away from the sheared edge. This displacement may cause the cut edge to be significantly non-perpendicular to the filament axis. In other instances, the filament may bend but not break or break fully, in response to the shear force, resulting in an uncut or partially cut filament. As a consequence, the filament may not shear in response to the applied shearing force or the cut fiber end may be unacceptably rough. The skilled person is aware that other parameters can be adjusted to provide a more complete cure of the end of the filament.

As noted above, curing the photocurable polymer causes the composite filament of fiber/particle-impregnated thermosetting polymer/UV curable polymer matrix to have an elastic stress response, such that the filament will retain its shape at least until the filament is heated to cure the thermoset polymer in the matrix.

In one embodiment, the filament is dispensed directly from the nozzle to form the printed article. The printed article may be supported by a substrate or may be formed of previously dispensed filaments supported by a substrate. The viscosity of the dispensed filament is such during dispense that the filament cannot be subjected to tensile forces to control deposition. Once deposited on the substrate, the filament is subjected to simultaneous cure of the UV-curable component, such that the stress response of the filament is viscoelastic. It is advantageous if the UV cured filament, even though only partially cured, has a stress response that is more elastic than viscous. Once the object is printed, the object is subjected to conditions that will cure the thermoset component of the filament.

After bringing the deposited filament together with the surface on which it is deposited, a compaction roller travels along the dispensed filament forcing the dispensed filament into contact with the underlying surface. The interface between the dispensed filament and the underlying surface on which the filament is deposited is compressed and cooled by the compaction roller. Cooling the deposited filament will reduce the ability of the thermosetting polymer in the polymer matrix material to flow freely prior to cure. Compressing the interface causes the liquid of the dispensed filament to intermix with the liquid portion of the surface on which the filament is dispensed. Such intermixing creates a seamless joining of the two surfaces.

The compaction roller is cooled to provide a high-quality interface between the dispensed filament and the surface on which it is dispensed. The temperature of the roller and the resulting cooling speed of the filament and the smoothness of the compaction roller are selected to provide an interface with low surface roughness that is substantially void-free.

As described above, the filament material is a composite material. "Composite" as used herein is a material made of at least two distinct materials. In one embodiment, the composite filament material is a polymer with carbon fibers distributed therein. In some embodiments, the at least one filament material is a continuous fiber composite comprising a thermoset polymer/UV-curable polymer/carbon fiber composite material in which the thermoset polymer has a curing temperature that is above the temperature at which the filament is dispensed.

In some embodiments, the at least one filament material has an as-deposited cross-sectional shape selected from the group consisting of circle, ellipse, parabola, hyperbola, convex polygon, concave polygon, cyclic polygon, equilateral polygon, equiangular polygon, regular convex polygon, regular star polygon, tape-like geometry, and any combination thereof In some embodiments, the at least one filament material has a diameter of about 0.1 millimeters to 5 millimeters. These shapes will likely be altered by the compaction roller.

Described herein is an assembly for 3D printing, the assembly including: a nozzle with a first channel through which can pass a composite filament; and a lighting apparatus adjacent the channel, where the lighting apparatus includes a support and at least one light source positioned on the support and where the at least one light source is positioned to direct at least a portion of the composite filament to UV radiation as the composite filament is dispensed past the light source; where the first channel terminates in an orifice where the composite filament is dispensed from the nozzle through the orifice; and where the at least one light source is a source for ultraviolet (UV) radiation and where the at least one light source is positioned on the support to direct the UV radiation onto at least a portion of the composite filament as it is dispensed past the light source.

In certain embodiments, the lighting apparatus includes a plurality of light sources where the plurality of light sources are placed on the support such that each light source of the plurality of light sources is about a same distance from the composite filament as the composite filament passes through the lighting apparatus. The plurality of light sources are integrated with the nozzle and direct the UV radiation toward the first channel. The support is configured such that each light source is positioned on the support approximately equidistantly from the composite filament as it passes through the lighting apparatus. In one embodiment, the assembly further include at least one of light baffles or light filters to direct UV radiation from the UV radiation source onto the composite filament in a predetermined location at a predetermined dose. The light source is configured such that a surface of the composite filament on which the UV radiation is incident is approximately equidistantly spaced from the light source. The support has one of a circular configuration, a hexagonal configuration, or an octagonal configuration. In one embodiment, the nozzle has a second channel, the second channel and the first channel having a common central axis, the second channel configured as an annular ring around the first channel, such that a material dispensed through the second channel forms a coating on the material dispensed through the first channel. In other embodiments the assembly includes a roller, the roller configured to exert a smoothing force onto the composite filament dispensed by the nozzle. In other embodiments, the assembly has an independently moveable UV radiation source, where the independently moveable UV radiation source is positioned to direct UV radiation onto the composite filament dispensed by the nozzle after the roller has passed over the composite filament dispensed by the nozzle. A steering mechanism is provided for the independently moveable UV radiation source, the steering mechanism having a motor and a controller, the controller configured to determine an amount and duration of the UV radiation to be directed toward the composite filament dispensed by the nozzle and the motor is configured to adjust a position of at least one of the UV radiation source. The steering mechanism further includes at least one mirror disposed in a light path from at least one of the UV radiation sources, where a position of the at least one mirror is controlled by the motor in response to a signal from the controller.

In one embodiment at least one light source is adjacent the orifice and the orifice is configured to direct UV radiation onto the composite filament dispensed through the orifice. The assembly further includes a second UV radiation source where the second UV radiation source is positioned in a downstream direction in the nozzle relative to the first UV radiation source such that the composite filament is exposed to the UV radiation from the first UV radiation source as it is dispensed therethrough before it is exposed to the UV radiation from the second UV radiation source as it is dispensed therethrough. The assembly where the nozzle and lighting apparatus form a unitary rotatable assembly.

In another embodiment the assembly for 3D printing includes a nozzle with an orifice through which can be dispensed a composite filament; a steered light source that includes at least one light source for UV radiation positioned adjacent the nozzle, where the steered light source includes a controller and a motor, where the motor controls a relative position of the at least one light source in order to direct UV radiation onto the dispensed composite filament, where the steered light source is advanced as the nozzle is advanced to dispense the composite filament. The controller directs a direction and intensity of the UV radiation from the at least one light source in response to instructions provided to the controller.

In certain embodiments, the steered light source includes a plurality of light sources where the plurality of light sources are placed on a support such that each light source of the plurality of light sources is about a same distance from the composite filament as the composite filament is dispensed from the nozzle. The support is configured such that each light source is positioned on the support approximately equidistantly from the composite filament as it passes the steered light source.

Also described herein is a method for 3D printing in which a composite filament is dispensed through an orifice. The composite filament including a curable polymer matrix portion where the curable polymer matrix has dispersed therein a plurality of fibers or particles, where the fibers or particles do not react with the curable polymer matrix. The curable polymer matrix includes a UV curable polymer and a heat curable polymer, where the curable polymer matrix includes at least one of monomers or oligomers or both and where the composite filament is at least about 30 volume percent to about 70 volume percent curable polymer matrix of which at least 80 volume percent is a thermoset or heat curable polymer and at least 4 volume percent is UV-curable polymer and the composite filament is about 30 volume percent to about 70 volume percent carbon fibers or particles. Upon dispense, the composite filament flows past a UV radiation source, where the UV radiation source is positioned to direct UV radiation toward the dispensed composite filament, at least partially curing the UV curable polymer in the composite filament. The composite filament is dispensed onto a surface to form a 3D printed article. The 3D printed article is then heated to cure the heat curable polymer in the curable polymer matrix.

In one embodiment the composite filament is about 32 volume percent to about 54 volume percent heat curable polymer, about 4 volume percent to about 12 volume percent UV curable polymer and about 40 volume percent to about 60 volume percent carbon fibers or particles. In other embodiments the polymer matrix portion of the composite filament is about 60 volume percent of the composite filament where about 4 volume percent to about 20 volume percent is UV curable polymer and about 80 volume percent to about 96 volume percent is heat curable polymer. In some embodiments, a ratio of UV curable polymer to heat curable polymer varies from about 1 volume percent UV curable polymer to about 24 volume percent thermoset polymer to about 1 volume percent UV curable polymer to about 4 volume percent thermoset polymer.

BRIEF DESCRIPTION OF THE DRAWINGS

FIG. 11 is a schematic of viscosity changes of the composite filament through both the UV photocure and subsequent thermal cure.

DETAILED DESCRIPTION

Figure 1:
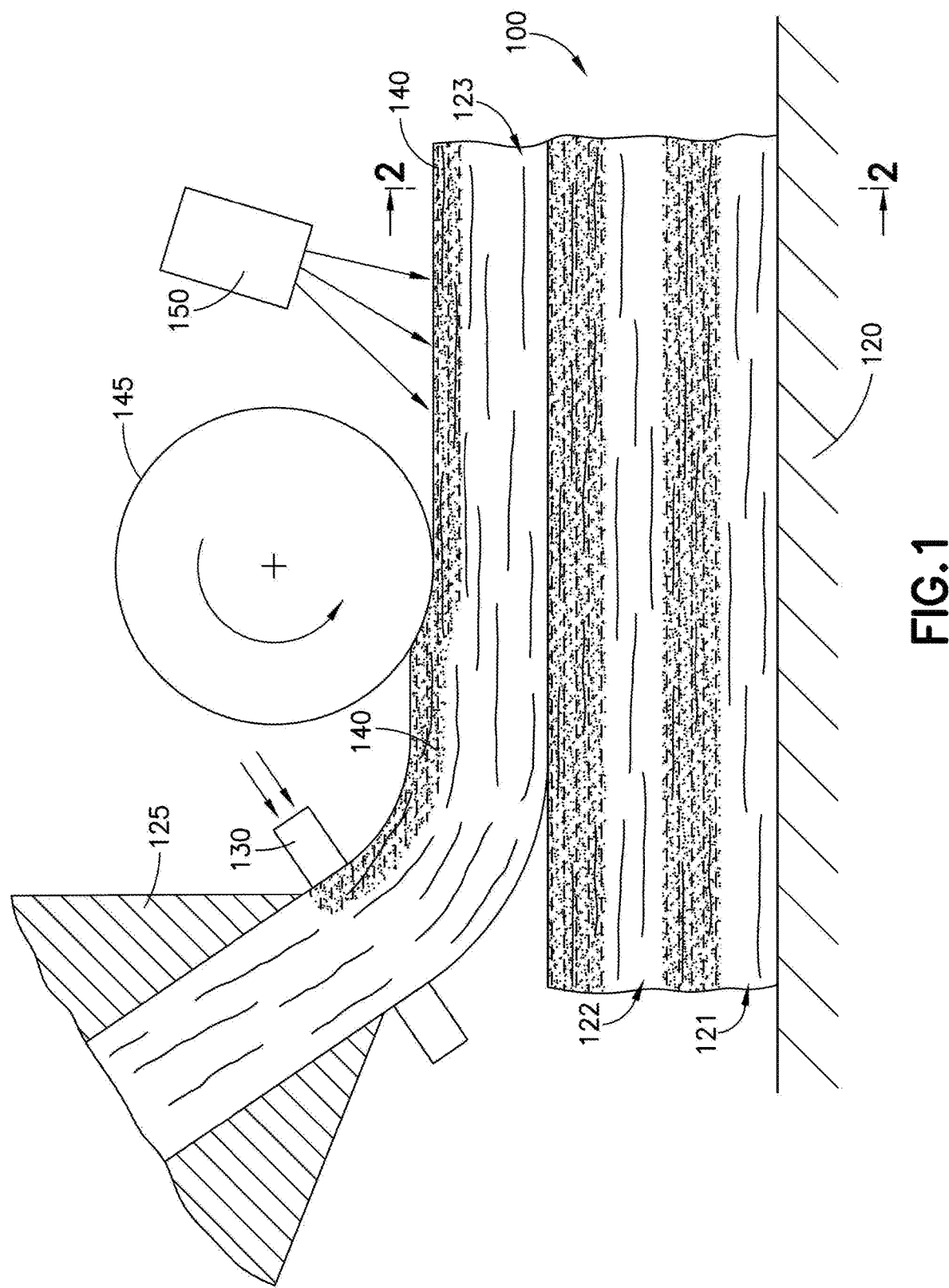
FIG. 1 illustrates a composite filament as described herein being dispensed through a light ring that is a source for UV radiation such that the polymer is partially cured when dispensed onto a 3D article being formed by an additive process.

The system and method described herein, significantly reduce manufacturing lead-time for the fabrication, via additive manufacturing, of parts (or, more generally, "objects") using filaments that are a composite of one or more thermosetting polymers, one or more UV curable polymers and carbon fibers. Examples of thermoset polymers include, but are not limited to PAI, polyesters, polyurethanes, polyimides, and epoxies. Examples of UV curable polymers (i.e. photopolymers) include, but are not limited to, acrylic-based photocurable resins (e.g., acrylated epoxy oligomer).

The uncured polymer matrix can include monomers and/or oligomers. The monomeric/oligomeric units in the matrix are not cross-linked prior to cure. One skilled in the art is aware that cross-linking the monomers/oligomers in the matrix increases the molecular weight of the matrix by forming polymers and thereby increasing the structural strength of the matrix.

Examples of methods, systems and materials that may be used to create or generate objects or parts herein are provided in U.S. Patent Publication Nos. 2014/0232035, 2016/0176118, and U.S. patent application Ser. Nos. 14/297,185, 14/621,205, 14/623,471, 14/682,067, 14/874,963, 15/069,440, 15/072,270, 15/094,967, each of which is entirely incorporated herein by reference herein.

In the illustrative embodiment, a modified fused composite filament fabrication (FFF) system and method are used to fabricate ("print") thermoset/UV-curable polymer-based 3-D objects. The method provides a composite filament having a polymer matrix that is a combination of a photocurable polymer and a thermoset polymer. The composite filament is also impregnated with fibers or particles. The fibers or particles can form either a continuous or discontinuous phase in the composite filament. The fibers or particles are selected from any suitable material that will not interact with the polymer matrix. Examples of inorganic materials are silica, metal, etc. Examples of organic materials are carbon, aramid fibers etc.

The polymer matrix can be formed and the fibers and particles embedded therein using conventional means such as a mixer, calendars, etc. In some embodiments the polymer matrix and fibers/particles are mixed in a nozzle just prior to the composite being dispensed as a filament in an additive process for forming a 3D article. As noted above, the viscosity of polymer matrix having particles or fibers in a continuous phase is about 1 pascal-seconds or less. In those embodiments in which the fibers/particles form a discontinuous phase in the filament, the viscosity is about 10 pascal-seconds to about 500 pascal-seconds. If the viscosity of the dispensed composite filament is not sufficiently low, then a poor-quality interface between the dispensed fiber and the surface on which it is dispensed may result. Such poor-quality interfaces are evidenced by surface voids.

In the system and method of the present invention, a source for UV radiation is provided adjacent the nozzle from which the composite filament is dispensed. The UV sources introduces a partially cured or even completely cured region into the dispensed composite filament. The amount of cure and the extent of cure can be controlled by steering the UV beam to a portion of the fiber as it is dispensed. Adjusting the exposure intensity and/or exposure time will affect the speed at which the filament can be dispensed. Therefore, the UV radiation beam needs to be steered along the axis of the deposited filament's axis. Beam steering apparatus that can manipulate both the light source and the beams emanating therefrom to provide a controlled dose of UV radiation to the filament as it is dispensed can be configured in many different ways. For example, the mechanism can be coupled to the nozzle assembly so that the nozzle and beam steering apparatus travel together. The beam steering mechanism can steer the light source using a motor that can be used to adjust the light source position to ensure that the beam emanating therefrom is consistently directed toward the filament to impart the desired extent of UV cure to the filament. In another example, mirrors can be moveably mounted to a beam steering mechanism. The light source directs light therefrom to the mirror and the mirrors are controlled to deflect the light beam in a light path toward the filament. The position of the light beam will be controlled by the programmable logic controller (PLC) of the printer. It will be synchronized with the motion of the print head, namely acceleration and deceleration, stops and turns, etc.

FIG. 1 illustrates one embodiment of system for dispensing a composite filament and partially curing the composite filament immediately after dispense, to partially cure the composite filament. FIG. 1 illustrates a 3-D article 100 being formed on a substrate 120. In the cut away side view of FIG. 1, there are three composite filaments 121, 122 and 123. Filament 123 is being dispensed on filament 122 which is supported by composite filament 121 which in turn is supported by the substrate 120. As the composite filament 123 is dispensed through nozzle 125, it is partially cured by a UV radiation source 130. The partially cured region of composite filament 123 is illustrated by shaded region 140. The uncured portion of the composite filament 123 is unshaded.

Upon dispense, the composite filament is directed onto composite filament 122 and added to the 3D article being formed. A compaction roller 145 is used to secure the composite filament 123 onto the underlying composite filament 122 by exerting sufficient pressure to achieve this objective but not to deform the composite filaments in a manner that would render the 3D object being formed out of specification. Because the resin in the portion of the filament in contact with the roller is partially cured, the tendency of the filament to adhere to the roller is reduced.

In the assembly illustrated in FIG. 1, a second UV source 150 trails the compaction roller 145. The second UV light source 150 can be seen to increase the cured portion of the composite filament (by enlarging the size of the cured region in the filament, increasing the extent of cure, or both) compared to the cured portion of the composite element that precedes the compaction roller. The roller 145 also stabilizes the dispensed filament 123 mechanically on the surface on which it is deposited by increasing the quality and extent of the interface between the dispensed filament and the surface on which it is placed.

Figure 2:
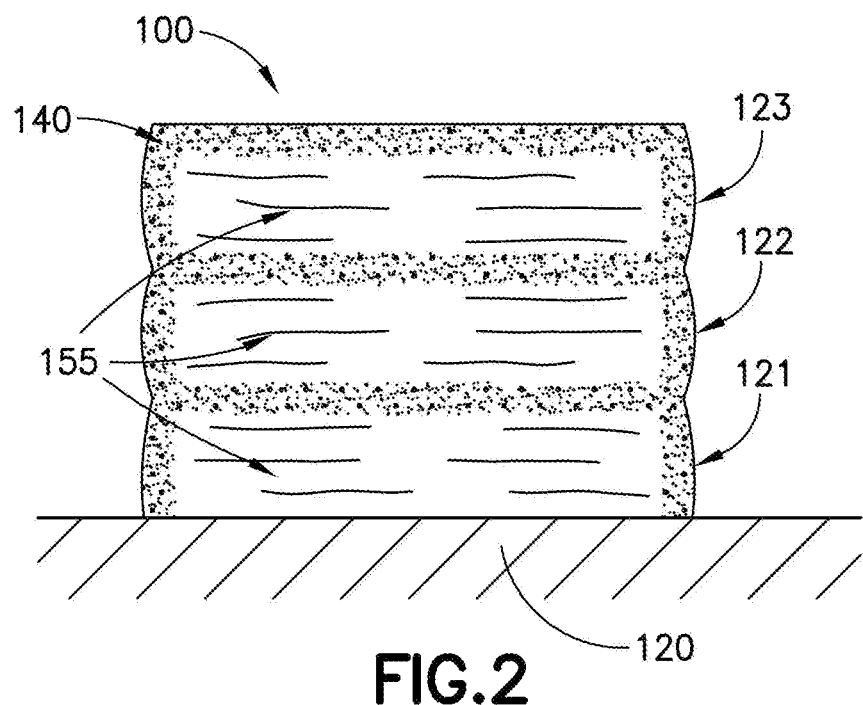
FIG. 2 illustrates a printed article formed by an additive process in which the filaments are only cured at the perimeter.

The 3D article formed using the system described in the system of FIG. 1 is illustrated in FIG. 2. FIG. 2 illustrates the formed article as three fused composite filaments 121, 122, and 123. After dispense, UV cure and 3D article formation, the article 100 cross-section illustrates cured exterior or perimeter portions 140 and uncured interior portions 155.

Figure 3:
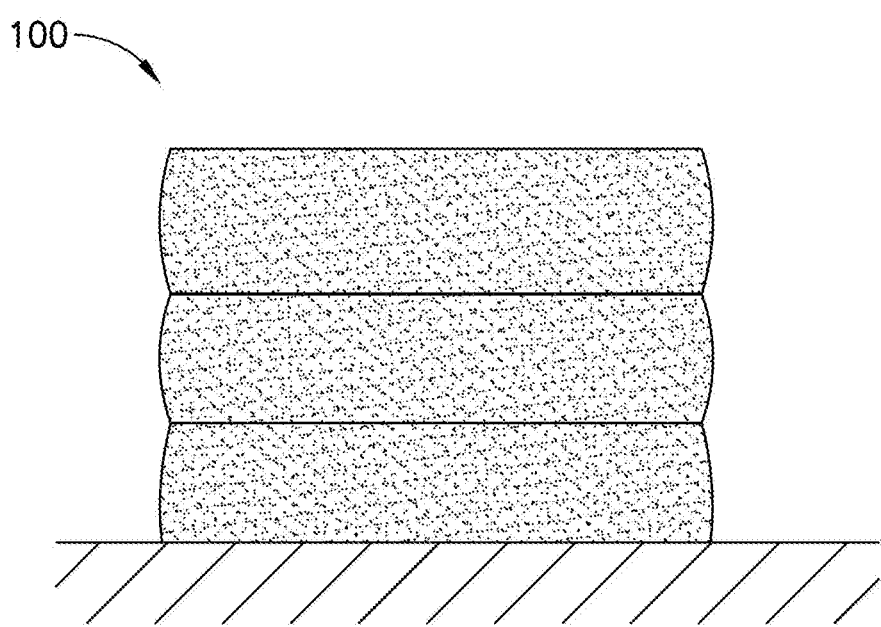
FIG. 3 is the printed article of FIG. 2 after thermal cure.

FIG. 3 illustrates the 3D article of FIG. 2 after being completely cured using heat, thereby curing the uncured portions of the polymer matrix (i.e. the thermoset polymer) of the composite filaments illustrated in FIG. 2.

Figure 4:
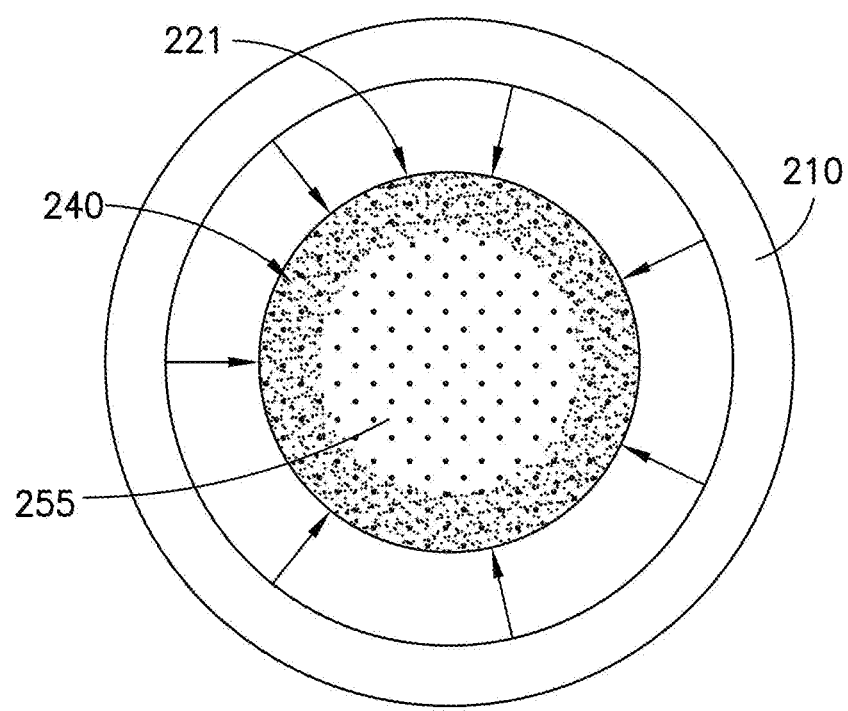
FIG. 4 is a cut away view of a filament passing through and being partially cured by UV radiation from a light ring over a partial circumference of the filament.

FIG. 4 illustrates an alternative embodiment of the system of FIG. 1. In this embodiment, the UV light source is a ring structure 210. The composite filament 221 is dispensed through the light ring structure 210. The perimeter region 240 of the composite filament is cured as the filament 221 passes through the UV light source ring structure 210. The extent of the perimeter region 240 depends on the speed at which the composite filament is dispensed through the UV light source ring structure. The extent of the perimeter region 240 is also affected by the transmission of the UV radiation through the matrix and the fiber. Particles that absorb the UV radiation may cause the polymer to cure less compared to the polymer in a filament where the particles or fibers transmit or reflect the UV radiation. Examples of suitable filament dispense speeds are about 0-50 mm/s. The dispense speed can be further increased by increasing the length of travel of the filament through the ring, thus extending the exposure time of the filament to the UV radiation emitted by the light sources yet maintaining the speed at which the filament is dispensed. To increase the filament length of travel through the light source ring structure 210, the width of the light source ring structure is increased (the width dimension is proximately parallel to the filament direction of travel through the light source ring structure). The extent of the perimeter region also depends on the intensity of the UV radiation. One skilled in the art can select a suitable dispense speed, distance of the UV light source from the dispensed fiber and suitable light source intensities for their particular application. One skilled in the art can also select the intensity of UV radiation that will provide the desired extent of cure based on the materials used for the composite filament; in particular the fiber/particle materials. As noted above, the intensity of UV radiation required to cure the UV curable polymer in the composite filament to that desired extent depends upon the material of the fibers or particles embedded in the polymer matrix. For a target extent of cure, a greater intensity is required to cure a polymer matrix with fibers or particles than absorb UV radiation than the intensity required to cure a polymer with fibers or particles that either reflect the UV radiation or through which the UV radiation is transmitted.

Figure 5:
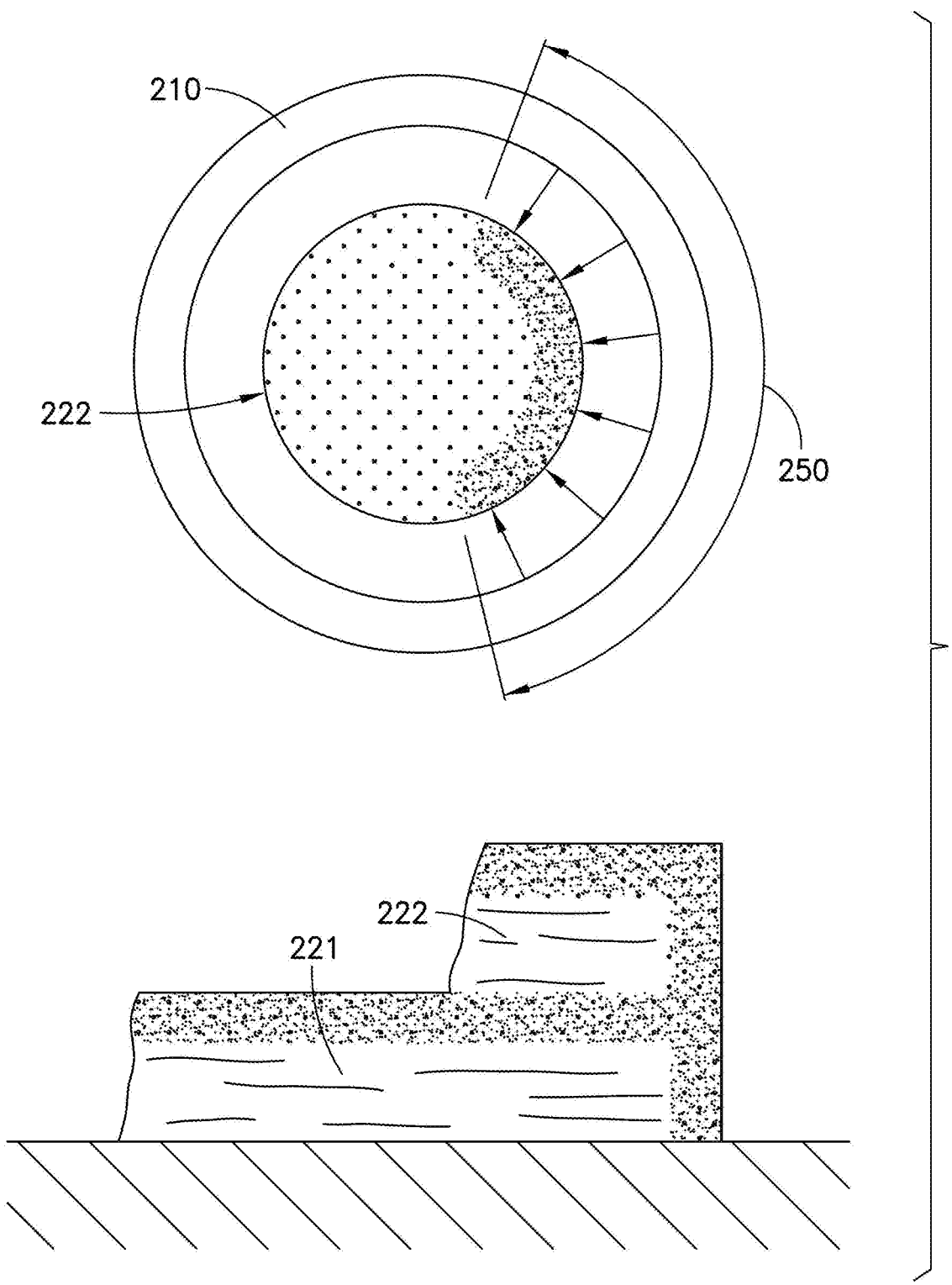
FIG. 5 illustrates a partial cure of only a portion of the filament perimeter by the light ring as it passes through the light ring and as dispensed.

FIG. 5 illustrates how the light ring can be controlled to cure only a certain extent of the perimeter of the composite filament. The light ring structure 210 is illustrated as projecting light over a finite arc 250 of its circumference. Therefore, only a portion of the circumference of the composite filament 222 is cured by the light ring as the composite filaments 222 passes through the light ring. The result of this targeted cure is that the composite filament 222 is cured on the top and sides but not on the portion that overlies and is in contact with the underlying filament 221. This facilitates the adhesion of the overlying composite filament 222 to the underlying composite filament 221 during dispense of the filament (i.e. printing).

Figure 6:
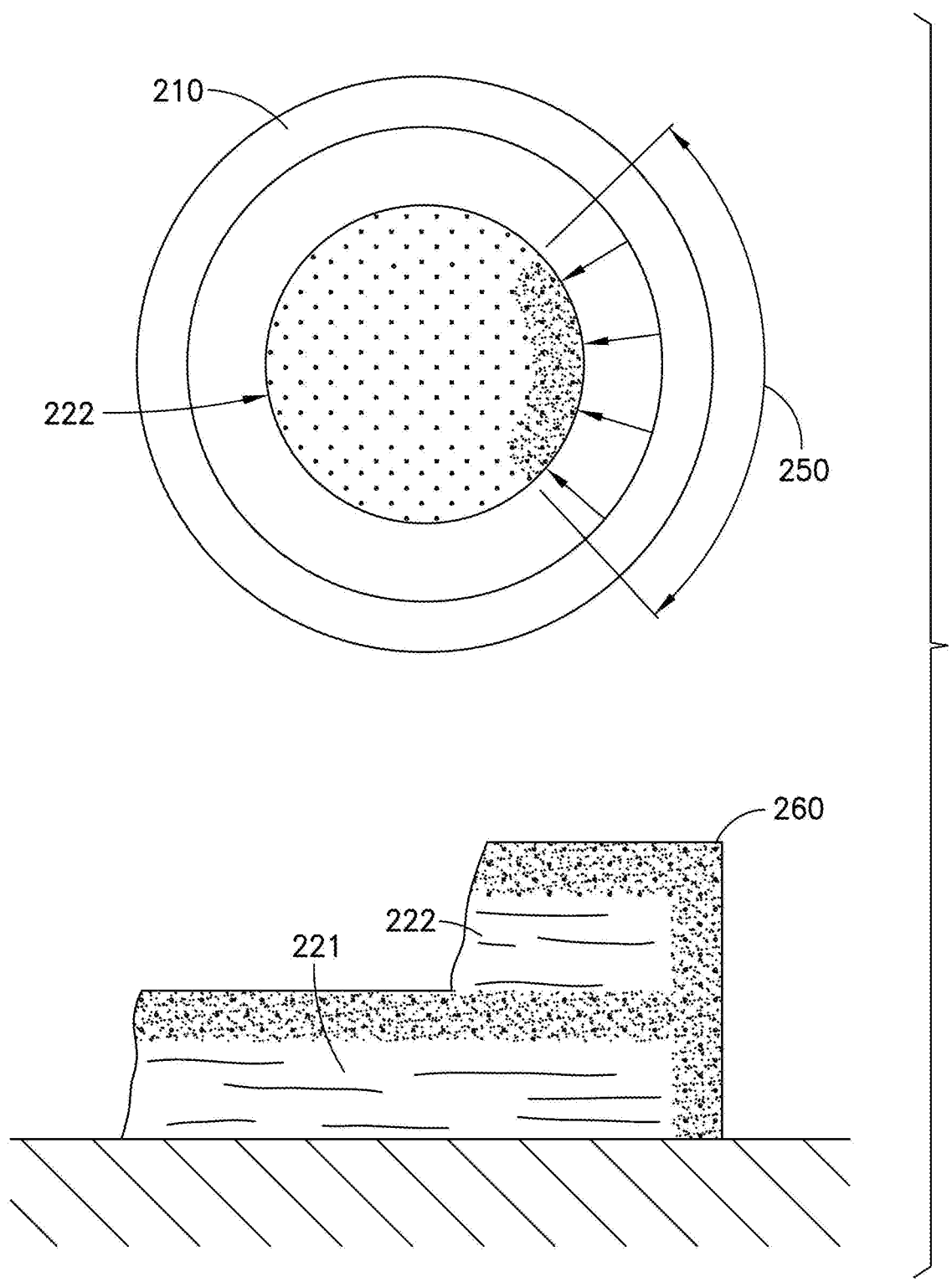
FIG. 6 illustrates a difference in the extent of partial cure compared with FIG. 5 for the portion of the filament that does not form the side of the fabricated article, just the top portion of the article.

Referring to FIG. 6, the finite arc 250 is reduced as the composite filament travels through the light ring structure 210. The reduction is because the extent of the UV cure is reduced for the portion of the composite filament 222 that does not form the termination region 260 of the composite filament 222. As described if further detail below, curing the end portions of the fibers to a greater extent than the interior portions of the creates a composite filament terminus that is less apt to deform or shred when the end of the fiber is cut following dispense of the length of composite filament onto the dispense surface.

Figure 7:
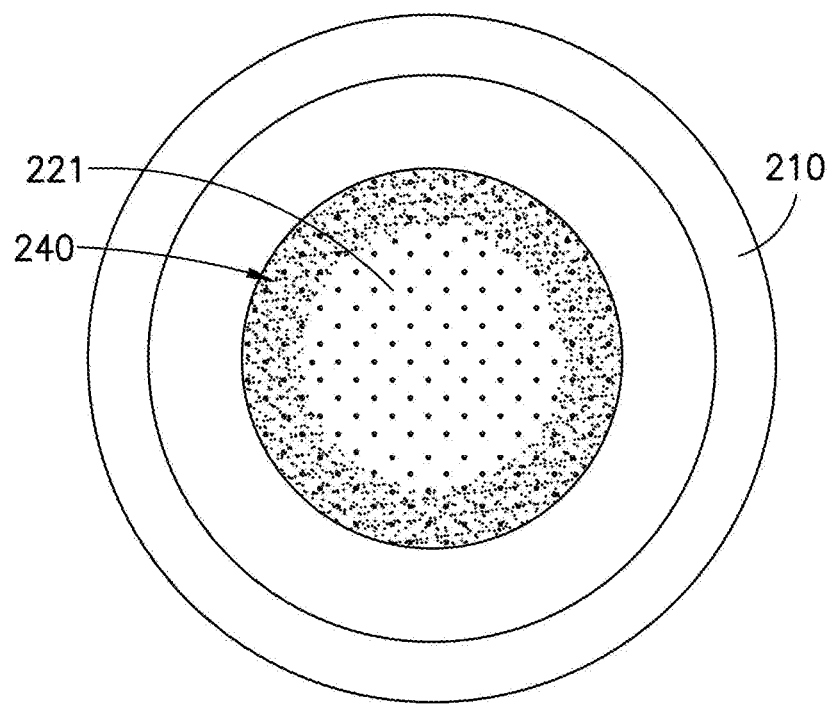
FIG. 7 illustrates a more extensive cure at the cut end of a filament.

Referring to FIG. 7, one embodiment of an end cure strategy is illustrated. For the end portion 260 of composite filament 221, the intensity of UV radiation is increased to provide a greater extent of cure in the perimeter region 240. The greater intensity of the UV radiation can be provided by increasing the UV radiation from the light ring 210 or by using a laser. Bringing the light sources closer to the composite filament is another strategy for curing the end portions of the composite filament (i.e. the portion of the composite filament that is cut following dispense).

Figure 8:
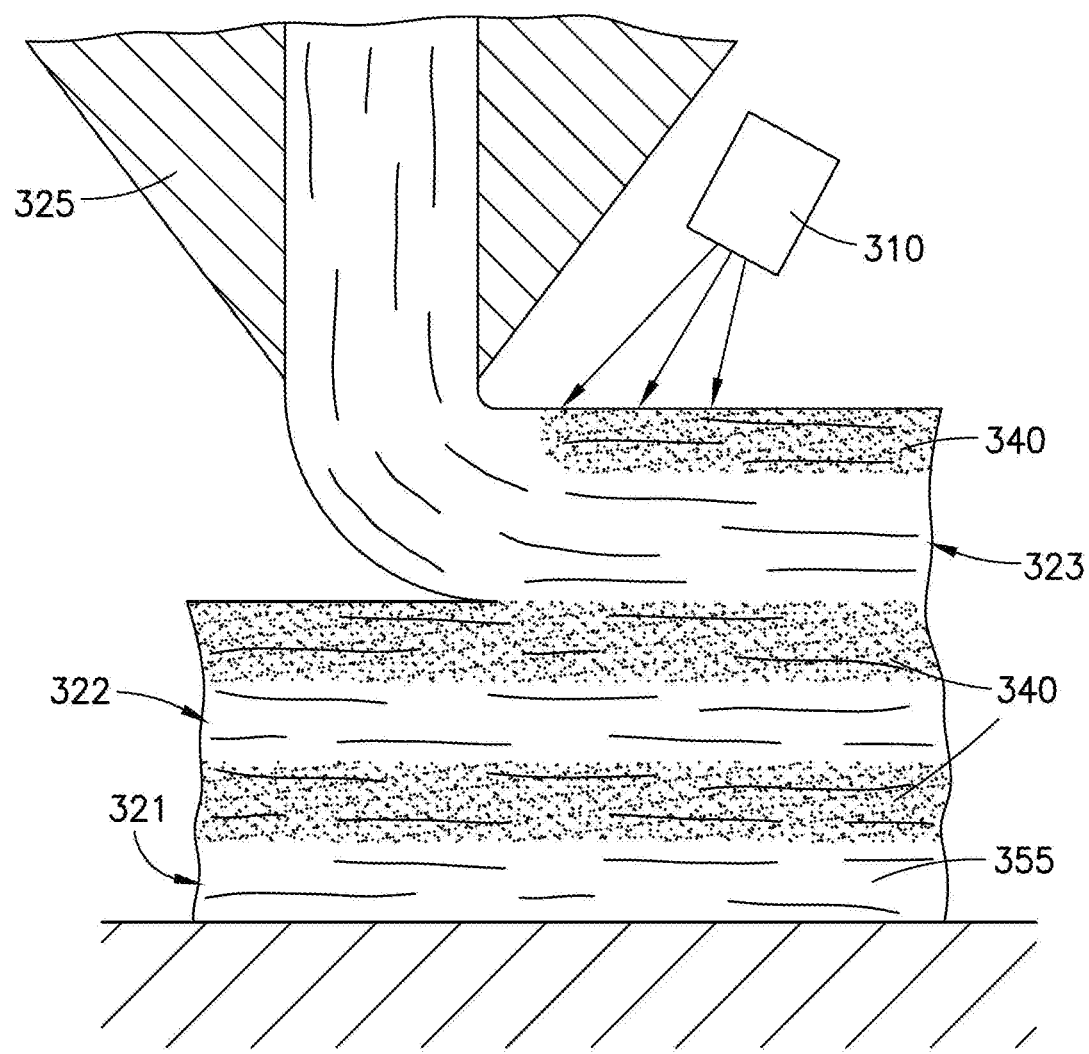
FIG. 8 illustrates a nozzle and UV light source assembly that allows for cure of filament dispensed immediately from nozzle.

FIG. 8 illustrates an embodiment in which the composite filaments (321, 322, 323) are dispensed by a nozzle 325. As the nozzle traverses over the structure being formed in the x direction (i.e. horizontally in the plane of FIG. 8) the composite filament is dispensed from the nozzle and on to the 3D structure being printed. In this embodiment, the UV light source 310 is steered to follow the nozzle 325 trajectory. The steered UV light source 310 cures the composite filaments as they are dispensed from the nozzle 325, curing the upper portion of 340 of the composite filament (321, 322, 323). As in other embodiments, only the upper portion 340 of the dispensed composite filament is cured. The lower portion 355 of the composite filament remains uncured during deposition to ensure that the dispensed filament fuses with the surface on which it is dispensed. In this embodiment, the light source 310 follows the nozzle 325. When deposition requires the nozzle 325 to change direction in the plane of travel, the light source must also change direction. The intensity of the UV radiation and the direction of the UV radiation will need to be adjusted when the nozzle is turned to maintain a uniform degree of cure and a targeted region of cure.

Figure 9:
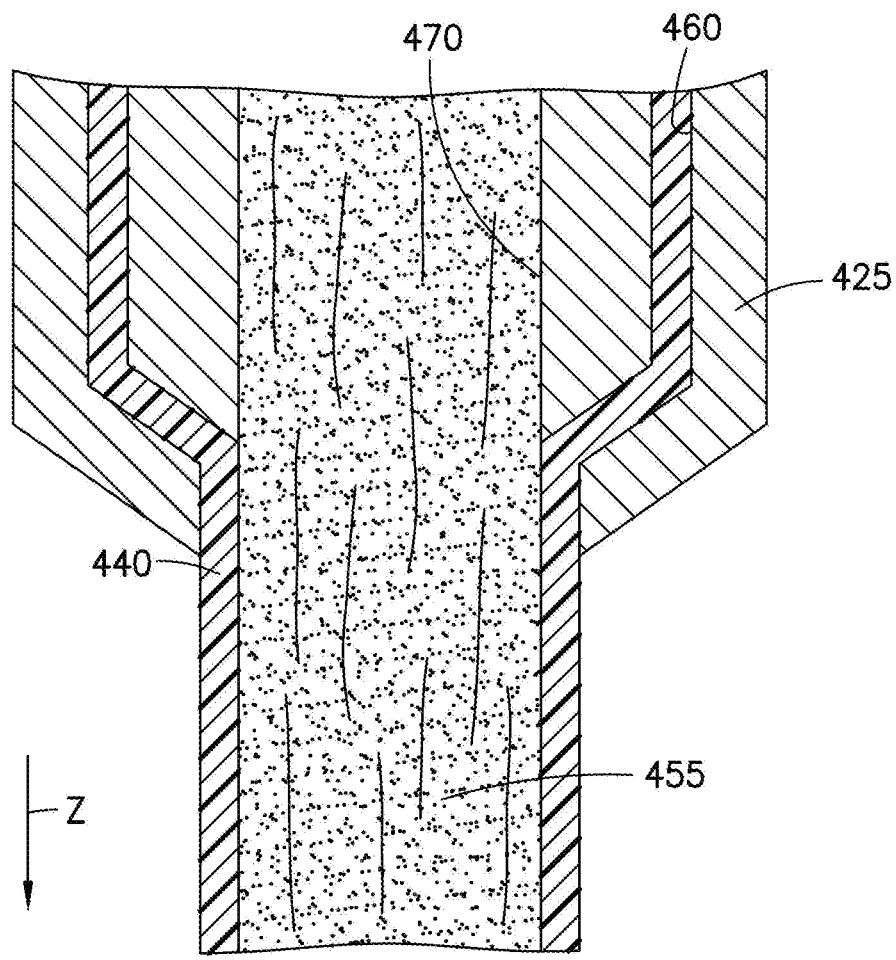
FIG. 9 illustrates forming a filament with an interior core of a thermoset polymer impregnated with fibers over which is formed an exterior sheath of UV curable polymer which is cured immediately upon dispense of the filament.

FIG. 9 illustrates an embodiment in which the thermoset/UV curable polymer mixture 440 is dispensed as a coating on a composite thermoset polymer core 455 with fibers and or particles embedded therein. In this embodiment, the nozzle 425 has two channels 460 and 470. As such, the nozzle 425 functions much like a co-extrusion die. The UV curable polymer flows through channel 460 and is dispensed over the composite core of thermoset polymer with fibers/particles embedded therein that flows through channel 470. This embodiment solves the problem of curing a UV curable polymer in a composite with carbon fibers, since carbon fibers block the transmission of UV radiation. The UV light source used to cure the UV curable polymer is not illustrated in FIG. 9. However, the UV light source is positioned such that the UV curable polymer 455 is exposed to the UV light after dispense and preferably prior to deposition to form the 3D printed article.

One skilled in the art is aware that polymer cure increases the molecular weight of the polymer as the monomeric or oligomeric units in the uncured matrix cross-link to form polymeric units. The cross-linked polymer has a greater structural strength than the uncured polymer. In those instances where not all of the reactive groups cross-link with each other, those reactive groups that remain un-cross-linked may cause the surface of the polymer to be sticky or tacky. Such stickiness or tackiness allows the dispensed composite filament to have a high-quality interface and adherence with the surface on which the composite filament is dispensed, and the composite filaments subsequently dispensed on the composite filament. The requisite material strength of the cured composite filament will depend on the shape and size of the 3D printed article, with larger articles requiring more strength. The skilled person can select the composition of the polymer matrix and curing conditions and dispense conditions that will meet the requirements of structural strength and composite filament tackiness of the partially cured polymer for the 3D article being formed.

Figure 10:
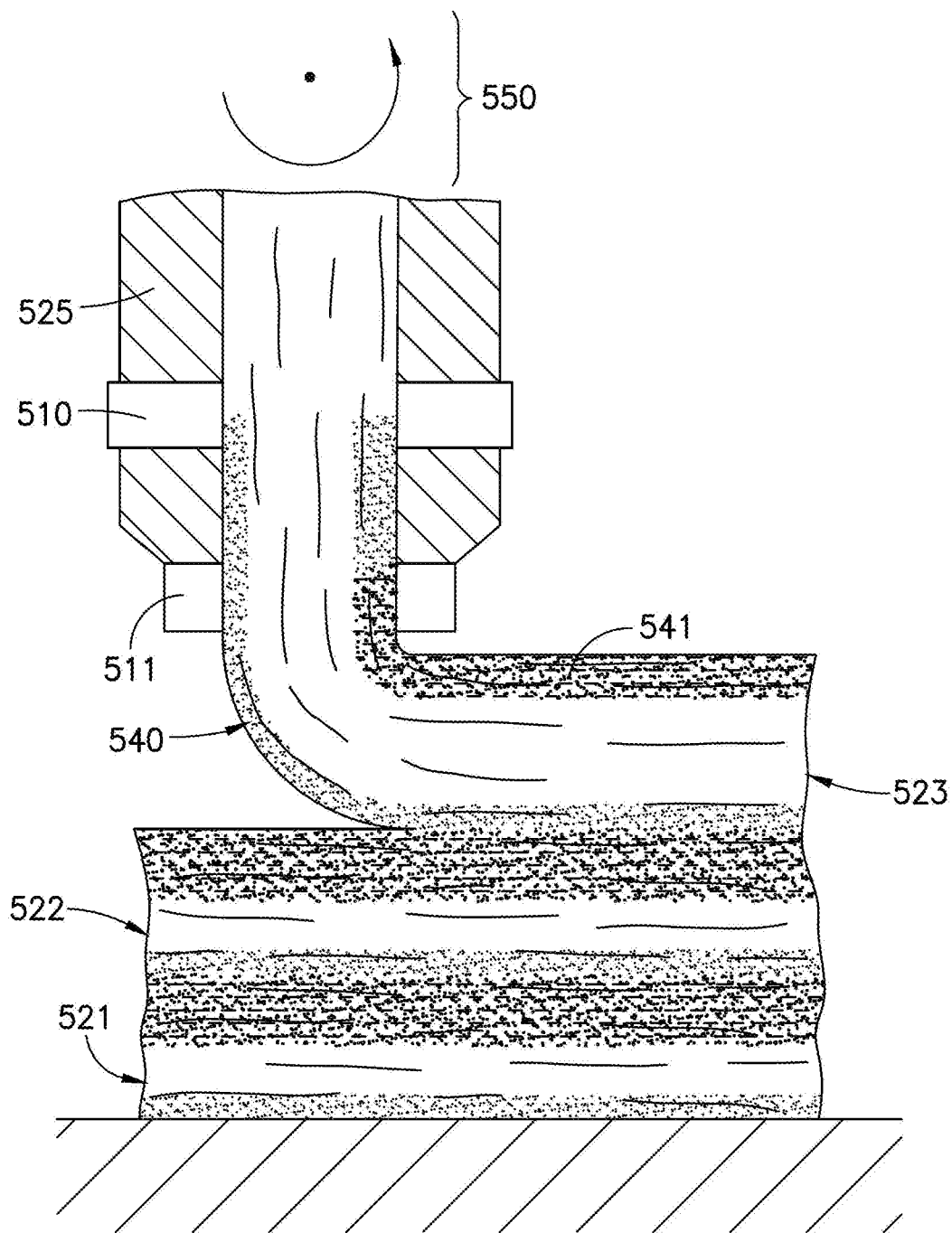
FIG. 10 is an alternative assembly for UV cure of the composite polymer matrix described herein as it is dispensed from the print head.

FIG. 10 illustrates an alternate nozzle 525 construction with first and second UV light rings (510 and 511, respectively) incorporated into the nozzle. As in prior illustrations, the printed structure is illustrated as three stacked composite filaments 521, 522 and 523. In this illustrated embodiment, first UV light source 510 partially cures the UV curable polymer at the perimeter 540 of the composite filament, leaving the core of the composite filament uncured. This first partial cure occurs just prior to dispense of the composite filament. Immediately upon dispense, a portion of the perimeter of the composite filament is more completely cured by light source 511 that does not cure the complete perimeter of the composite filament 523. That more completely cured portion is illustrated as darker shaded region 541. Note that the more completely cured portion 541 is not the portion of the composite filament 523 that contacts the surface on which the composite filament 523 is deposited. As noted above, a less complete cure of this portion of the composite filament surface allows the dispensed composite filament to fuse to the underlying surface. The integration of the UV light sources into the nozzle provides a composite filament print head that can be rotated (rotation illustrated schematically by 550) to change the direction of print head travel. Since the UV light sources are monolithically integrated with the nozzle in the print head, the issues noted above regarding control of the intensity and direction of the UV light source that trails behind the print head are not presented in this embodiment. With this design, a roller is not required to control the height of the dispensed composite filament because the small distance between the nozzle outlet and the surface on which the composite filament is dispensed will control the filament height.

The composite filaments contemplated for use in the present invention carry about 30 volume percent to about 70 volume percent fiber. The remaining volume percent (i.e. 70 volume percent to about 30 volume percent) is resin. The resin contains both a UV curable resin and a thermoset (or thermal cure) resin. In one embodiment, the resin portion of the composite filament is at least about 4 volume percent UV curable resin and at least about 80 volume percent thermoset resin. Typical ranges for the two types of resins in the resin portion of the composite filament is about 4 volume percent to about 20 volume percent for the UV curable resin in the resin portion and 80 volume percent to 96 volume percent of the thermoset resin in the resin portion. In one embodiment, if the fibers are 40 volume percent of the composite filament, then the resin portion of the composite filament is 60 volume percent. Of the 60 volume percent resin component, about 4 volume percent to about 20 volume percent is UV curable resin and 80 volume percent to 96 volume percent is thermoset resin. Expressed as a ratio, the ratio of UV curable resin to thermoset resin varies from 1:24 to 1:4 (6:24). This includes all intermediate ratios including, but not limited to 2:24, 3:24, 4:24 and 5:24. In the embodiments where the composite filament is about 40 volume percent to about 60 volume percent fibers or particles, if the resin components are expressed in terms of percent total volume of the filament (instead of being expressed as a percentage of the resin component), about 32 volume percent to about 54 volume percent of the total composite filament (instead of the resin portion) is thermoset polymer, and about 4 volume percent to about 12 volume percent of the total composite filament (instead of the resin portion) is UV-curable polymer The composite filament is dispensed from a nozzle as described above. The composite filament has a liquid characteristic that allows it to wet surfaces that it contacts when dispensed from the nozzle but, upon exposure to UV radiation, the composite filament has an elastic stress response more consistent with a solid material. As noted above, the exposure conditions to UV radiation (e.g., dispense speed, exposure time, exposure intensity, etc.) determine the surface characteristics (e.g. smoothness, tackiness, etc.) of the dispensed composite filament. In some embodiments the dispensed composite filament has an elastic response to stress characteristic of solids.

Prior to dispense, the composite material is stored at approximately room temperature to avoid latent curing of the thermoset polymer. The composite material is stored in a reservoir with no light exposure to avoid curing the UV-curable polymer during storage. Maintaining a low viscosity of the composite during storage ensures that the composite material will flow acceptably when dispensed. Avoiding conditions during storage that might cause a portion of the composite to cure ensures that the composite material will be metered accurately and that target printing speeds are met. Also, avoiding partial cure ensures that the curing conditions selected for the composite material will impart the desired properties to the composite material (i.e. target viscosity after UV cure and target viscosity after thermal cure).

When dispensed, the composite filament flows from the nozzle and is deposited on the substrate. In one embodiment, the print head nozzle from which the liquid composite is dispensed is traversed over the substrate. As the print head dispenses the composite, a source of UV radiation directs the UV radiation at the dispensed composite, thereby partially curing the composite filament as it is dispensed. As noted above, the UV cured portion of the composite filament causes the partially cured composite filament to have an elastic stress response that is characteristic of a solid material (i.e. the partially cured composite filament has an elastic stress response). As such, the partially cured composite has sufficient mechanical integrity to withstand deformation during deposition of adjacent beads and layers at room temperature.

The dimensions of the deposited composite filament are largely a matter of design choice. However, the dimensions of the composite filament must be compatible with the method by which the filament is to be cured. For UV cure, the dimensions are selected so that the interior of the filament can be cured for the selected cure conditions. If the composite filament is too thick, the extent to which the interior of the composite filament is cured may be unsatisfactory. Similarly, the dimensions of the composite filament are selected so that the thermoset polymer in the composite filament will be cured through the entire thickness of the composite filament during thermal cure. Both for UV cure and thermal cure, the dimensions for the composite filament are selected so that the polymers are cured substantially uniformly through the thickness of the filament.

The dimensions of the composite filament also depend on the duration of the cure and the quantum of energy delivered by the curing conditions. More intense UV radiation will obviously provide a more rapid UV cure than if less intense UV radiation were used. Similarly, a quicker thermoset might be achieved using a higher temperature than a lower temperature (but any temperature will need to be above the thermoset temperature threshold).

During dispense of the composite filament onto the substrate, the UV source is positioned such that the dispensed filament is exposed to UV radiation upon dispense. The residence time of the composite filament to UV exposure is largely a matter of design choice and will depend upon the viscosity of the filament upon dispense, the dimensions of the composite filament and the conditions required to cure the specific UV-curable polymer or UV-curable polymer blend in the composite filament.

In some embodiments, the dispensed composite filament is pressed into place with a compaction roller. Use of compaction rollers when depositing filaments for 3D printing is known and described in PCT/US2017/035551, which is incorporated by reference herein. A compaction roller travels along the dispensed filament forcing the dispensed filament into contact with the underlying surface. The interface between the dispensed filament and the underlying surface on which the filament is deposited is compressed and cooled by the compaction roller. Compressing the interface causes the uncured polymer of the dispensed filament to form a high-quality interface with the surface on which the composite filament is dispensed. In the present context, a high-quality interface is a seamless joining of the two surfaces. The UV source can direct UV radiation to cure the dispensed composite filament either before or after the filament is compacted as described above. Curing prior to compaction provides a filament with more dimensional stability and is better suited for low viscosity filaments. Curing after compaction provides a more malleable filament for compaction and is better suited for higher viscosity filaments.

As the roller compacts the composite filament, it is important to ensure that the filament does not adhere to the roller. The roller is provided with a non-stick surface for this purpose. Examples of suitable roller materials include polished steel and Teflon coated rollers. The selection of the roller material depends upon the polymer matrix of the composite filament being dispensed, with tackier matrices requiring a more non-stick roller surface. Also, the UV source can be directed to the sides of compaction roller to ensure cure of the filament that might otherwise build up on the sides of the roller.

Further in this regard, filter or light baffles can be used to direct the UV radiation to create regions of cure/less cure/no cure if such are needed for filament dispense in a particular application. While embodiments herein refer to the light source as a "light ring" there is no requirement for the light source support to be in a circular configuration. The design considerations for distributing the light sources on the structure through which the composite filaments passes are that the individual light sources distributed on the structure are positioned approximately equidistant from the composite filament. This will ensure that the light intensity incident on the composite filament from each light source is approximately the same (assuming that the light sources themselves are the same and the power to each light source is the same). Consequently, the light source mounting structure for the individual light sources can be in a circular configuration, a hexagonal configuration, an octagonal configuration, etc. so long as the light source in the aggregate meets these requirements.

Since there are multiple light sources provided on the support structure, each light source can be controlled individually to cure different regions along the circumference of the composite filament to different extents. For example, in instances where greater pliability is desired in the central contact regions of the filament but less pliability is desired at the edges (for example to control the filament from being pressed out of the sides of the compaction roller during compaction). Referring to FIGS. 6 and 7, the ring UV light source 210 can be used to expose targeted regions of the composite filament 222 as it passes through the ring light source 210. The skilled person will understand that this could be accomplished by providing baffles that will shield certain regions of the composite filament 222 from exposure to UV radiation or controlling the power to the individual light sources to customize the intensity of light incident on a particular portion of the composite filaments. Alternatively, only a subset of the light sources on the light source support structure are activated to target such that UV radiation is only incident on discrete areas of the composite filament where cure is desired (e.g. the tops and ends of the fiber).

An embodiment where the UV light source is steered to expose targeted regions of the composite filament being dispensed is illustrated in FIG. 8. A steered UV light source is desirable when the targeted cure region of the composite filament will vary during dispense. For example, if the composite filament is dispensed on a vertical side of the object being printed, the direction of the source beam relative to the compaction roller will need to be adjusted relative to the direction of the UV source beam when the composite filament is dispensed on the top of the article. In such embodiments, the UV source and the compaction roller are advanced independently to ensure that the radiation from the UV source is propagated toward the desired region of the filaments. In such embodiments it is advantageous if the trajectory of the UV radiation beam can be controlled independently from the trajectory of the compaction roller.

In those embodiments where the composite filament is dispensed into free space rather than on a substrate (e.g. the 3D doodler light pen) the UV beam is steered to cure the portions of the article that support the structure. For example, if the composite filament when formed is unsupported, the composite filament must be cured to the extent necessary for the composite filament to provide the necessary structural support for the 3D article being formed.

One advantage of the use of UV curable polymers in the composite filaments is that the UV cure is faster than a thermal cure. However, UV cure can be limited by the presence of carbon fibers and color fibers in the polymer matrix, since UV radiation does not penetrate carbon fibers, color fibers etc.

As noted above, the composite filament materials are selected along with the dispense/deposition conditions that provide a high-quality interface between the composite filament being dispensed and the 3D article on which the composite filament is dispensed. As noted above, the monomers or oligomers in the uncured polymer matrix carry reactive moieties that cross link with other reactive moieties during cure.

In an alternative embodiment, in addition to the cross-linking reactive moieties, the monomers, oligomers or polymers of the matrix can carry reactive groups that do not cross link in response to UV radiation or heat. Therefore, these reactive groups remain unreacted when the composite filament is dispensed onto the 3D article being formed. If the previously dispensed composite filaments that form the surface on which the composite filament is dispensed also carries these reactive groups, the reactive groups from the dispensed composite filament may react with reactive groups on the surface may react with each other, forming a high-quality interface between the dispensed composite filament and the surface on which is dispensed. One skilled in the art is aware that curing monomers or oligomers using UV radiation can occur either by radical photopolymerization or cationic photopolymerization. In general, the photons are absorbed by a photoinitiator, which either produces free radicals in response, or which has an additional group (e.g., an onium salt for epoxies) that absorbs photons to form primary (e.g., cations) and secondary reactive groups (e.g., protonic acids). Suitable photoinitiators are well known to those skilled in the art and not described in detail herein. Photoinitiators are commercially available from a variety of sources. The mechanisms for UV radiation cure are well known to one skilled in the art and not described in detail herein.

Thermal cure thermosets, on the other hand, normally cure very slowly (days) at room temperature. However, the reaction can be accelerated by curing at higher temperatures (e.g. temperatures close to the glass transition temperature ($T_g$) of the thermoset material. To inhibit the cross-linking of thermosets at lower temperatures, (which makes them more stable for storage) the reactive groups are blocked. The reactive groups are "unblocked" and only released when the thermoset is heated above a threshold temperature.

After deposition, the article is heated to induce the thermoset polymer to cure. Thermoset polymers for additive manufacturing are described in US Patent Publication No. 20160266573 to Bheda et al. which is hereby incorporated by reference. Conditions for curing thermoset polymers are also described in Bheda et al. During thermal cure the viscosity of the resin decreases, which allows the filament being cured to flow into the micro-gaps and voids in the underlying substrate/previously dispensed composite. However, the viscosity of the dispensed filament is such that the filament material can flow in response to gravitational forces but not so low that the filament material will flow in response to the application of external pressure. A desired viscosity response in response to the curing conditions is illustrated in FIG. 11. During UV cure viscosity increases to a value and plateaus through the duration of the UV cure. As noted elsewhere herein, UV cure is following by 3D article formation. Following the formation of the 3D article, it is subjected to a thermal cure. As noted in FIG. 11, viscosity initially decreases in response to the thermal cure since the material response initially is a softening in response to the increased temperature. Soon thereafter, viscosity begins to increase as crosslinking in response to the elevated temperature begins to take place. The slight dip in viscosity is advantageous in that the lowered viscosity improves the intra composite filament interfaces. Viscosity dips of more than about one half of the viscosity increase from the UV cure are not preferred, since filaments with lower viscosities will not hold their shape. Viscosity dips of less than about ten percent from UV cure will not provide much interface improvement, since micro-gaps and voids will not fill as well as when the viscosity dip is larger.

The thermal cure deployed is largely a matter of design choice. In some embodiments, the printed article is cured as it is fabricated. In such embodiments, heat can be applied to the substrate on which the printed article is supported during fabrication. Heat from the support is conducted through the printed article being formed thereon. The carbon fibers embedded in the composite conduct heat through the composite causing the composite to cure. Heat can be applied to the substrate by any conventional means known to those of ordinary skill in the art. Non-limiting examples of suitable means for heating the article include induction heating using electro-magnets. In one embodiment the printed article is placed in an oven for thermal cure. Although not a requirement for practice of the present invention, to speed processing and gain efficiency, multiple articles can be cured in an oven together. In some embodiments, multiple heat sources can be used for thermal cure. In these embodiments, the thermal cure can be customized for different regions of the printed 3D article. This is advantageous in those contexts where interlayer bonding is particularly critical for the strength and performance of the printed 3D article. For example, in some embodiments, the surface of the printed 3D article might require a more extensive cure to promote interlayer bonding that will satisfy the structural requirements for the printed 3D article. By supplementing the oven cure with more targeted heat sources, extra heat energy can be delivered to those portions of the printed 3D article that require enhanced thermal cure.

In some embodiments, the composite material is printed as a 3D skeleton or scaffold structure on which the composite material is dispensed to form complex 3D printed structures and subsequently cured. In other embodiments, the printed 3D article is large. In still other embodiments, smaller, more complex 3D printed articles are actually formed on larger less complex thermoset articles produced with conventional processing technologies such as Resin Transfer Molding (RTM), Sheet Molding Compound (SMC), or even thermoset injection molding. All of these 3D printing scenarios require different curing strategies to meet the objective of high quality printed articles. The composite filament polymer matrix described herein supports advantageous curing strategies by allowing the composite filament to be somewhat cured when dispensed, providing greater structural integrity to the 3D article being formed prior to thermal cure yet allowing the composite filament to remain sufficiently uncured during 3D article printing to ensure that a high-quality interface is formed between the composite filaments that form the printed article. Targeted cure strategies and capabilities provide additional advantages in that the strength of the 3D printed article can be tailored to the needs of a particular design or specification.

In addition to the polymer matrix, the embedded fibers or particles are selected to support these objectives. As noted above, different degrees of cure for a given intensity of UV radiation incident on the matrix are achieved for a given polymer matrix composition if the fibers/particles are made of glass (which transmits UV radiation) than carbon (which absorbs UV radiation). The materials of the fibers/particles embedded in the polymer matrix of the composite filaments is considered when selecting the curing conditions to ensure that the regions of the composite filament targeted for UV cure are cured to the desired extent.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for 3D printing comprising:
dispensing through an orifice in a nozzle onto a surface a composite filament comprising a curable polymer matrix, wherein the curable polymer matrix has dispersed therein a plurality of fibers or particles, wherein the plurality of fibers or particles do not react with the curable polymer matrix;
wherein the curable polymer matrix comprises a UV curable polymer and a heat curable polymer, wherein the curable polymer matrix comprises monomers, oligomers, or both, and wherein about 30 volume percent to about 70 volume percent of the composite filament is the curable polymer matrix, wherein at least 80 volume percent of the curable polymer matrix is the heat curable polymer and at least 4 volume percent of the curable polymer matrix is the UV curable polymer, and about 30 volume percent to about 70 volume percent of the composite filament is the plurality of fibers or particles;
exposing the composite filament to a first UV radiation source, wherein the first UV radiation source is positioned to direct UV radiation toward the composite filament, at least partially curing the UV curable polymer in the composite filament;
compacting the at least partially cured composite filament with a roller;
exposing the at least partially cured composite filament to a second UV radiation source, wherein the second UV radiation source is positioned such that it trails the roller;
forming a 3D printed article; and
heating the 3D printed article to cure the heat curable polymer in the curable polymer matrix.

2. The method of claim 1, wherein about 32 volume percent to about 54 volume percent of the composite filament is the heat curable polymer, about 4 volume percent to about 12 volume percent of the composite filament is the UV curable polymer, and about 40 volume percent to about 60 volume percent of the composite filament is the plurality of fibers or particles.

3. The method of claim 1, wherein about 60 volume percent of the composite filament is the curable polymer matrix, wherein about 4 volume percent to about 20 volume percent of the curable polymer matrix is the UV curable polymer and about 80 volume percent to about 96 volume percent of the curable polymer matrix is the heat curable polymer.

4. The method of claim 3, wherein a ratio of the UV curable polymer to the heat curable polymer varies from about 1 volume percent of the UV curable polymer to about 24 volume percent of the heat curable polymer to about 1 volume percent of the UV curable polymer to about 4 volume percent of the heat curable polymer.

5. The method of claim 4, wherein the ratio of the UV curable polymer to the heat curable polymer is about 2 volume percent of the UV curable polymer to about 24 volume percent of the heat curable polymer.

6. The method of claim 4, wherein the ratio of the UV curable polymer to the heat curable polymer is about 3 volume percent of the UV curable polymer to about 24 volume percent of the heat curable polymer.

7. The method of claim 4, wherein the ratio of the UV curable polymer to the heat curable polymer is about 4 volume percent of the UV curable polymer to about 24 volume percent of the heat curable polymer.

8. The method of claim 4, wherein the ratio of the UV curable polymer to the heat curable polymer is about 5 volume percent of the UV curable polymer to about 24 volume percent of the heat curable polymer.

9. The method of claim 1, wherein the nozzle comprises a lighting apparatus adjacent to a channel in the nozzle through which the composite filament is dispensed, wherein the lighting apparatus is the first UV radiation source.

10. The method of claim 9, wherein the lighting apparatus comprises a plurality of light sources integrated with the nozzle, wherein the plurality of light sources are positioned to direct the UV radiation toward the channel.

11. The method of claim 9, wherein the lighting apparatus comprises at least one of light baffles or light filters to direct the UV radiation from the first UV radiation source onto the composite filament in a predetermined location at a predetermined dose.

12. The method of claim 10, wherein the lighting apparatus comprises a support for the plurality of light sources, wherein the support has one of a circular configuration, a hexagonal configuration, or an octagonal configuration.

13. The method of claim 12, further comprising dispensing the composite filament through the lighting apparatus.

14. The method of claim 1, wherein the second UV radiation source is independently moveable and directs the UV radiation onto the composite filament dispensed by the nozzle after the roller has compacted the composite filament.

15. The method of claim 14, further comprising moving the second UV radiation source to direct the UV radiation toward the composite filament using a steering mechanism comprising a motor and a controller, the controller configured to determine an amount and a duration of the UV radiation to be directed toward the composite filament dispensed onto the surface and the motor is configured to adjust a position of the UV radiation source.

16. The method of claim 9, wherein the lighting apparatus is configured to direct the UV radiation onto the composite filament prior to dispensing the composite filament from the nozzle.

17. The method of claim 16, wherein the lighting apparatus comprises upper and lower UV radiation sources, wherein the lower UV radiation source is positioned in a downstream direction in the nozzle relative to the upper UV radiation source such that the composite filament is exposed to UV radiation from the upper UV radiation source as it is dispensed therethrough before it is exposed to UV radiation from the lower UV radiation source as it is dispensed therethrough.

* * * * *